US007371316B2

(12) United States Patent
Newton

(10) Patent No.: US 7,371,316 B2
(45) Date of Patent: May 13, 2008

(54) PRODUCTION OF LOWER MOLECULAR WEIGHT HYDROCARBONS

(76) Inventor: Jeffrey P. Newton, 118 N. Sunset Dr., Ithaca, NY (US) 14850

( * ) Notice: Subject to any disclaimer, the term of this patent is extended or adjusted under 35 U.S.C. 154(b) by 575 days.

(21) Appl. No.: 10/627,240

(22) Filed: Jul. 24, 2003

(65) Prior Publication Data

US 2004/0016676 A1 Jan. 29, 2004

Related U.S. Application Data

(60) Provisional application No. 60/398,089, filed on Jul. 24, 2002.

(51) Int. Cl.
*C10G 11/00* (2006.01)
*B01J 21/02* (2006.01)

(52) U.S. Cl. ............... 208/113; 208/120.01; 208/106; 208/120.35; 208/120.15; 502/202; 502/224; 502/225; 502/229

(58) Field of Classification Search .......... 208/113, 208/120.01, 106, 120.35, 120.15, 131; 502/202, 502/224, 225, 229
See application file for complete search history.

(56) References Cited

U.S. PATENT DOCUMENTS

| 2,497,176 | A | * | 2/1950 | Mason ................. 208/144 |
| 2,956,096 | A | * | 10/1960 | Schriesheim ............ 585/744 |
| 3,403,108 | A | * | 9/1968 | Leftin et al. ............. 502/74 |
| 3,644,557 | A | * | 2/1972 | Senes et al. ............ 585/651 |
| 3,867,308 | A |  | 2/1975 | Elliott, Jr. |
| 3,957,689 | A |  | 5/1976 | Ostermaier et al. |
| 4,300,324 | A | * | 11/1981 | Koeppel .................. 52/612 |
| 4,427,539 | A |  | 1/1984 | Busch et al. |
| 4,450,241 | A | * | 5/1984 | Hettinger et al. ........ 502/34 |
| 4,469,588 | A | * | 9/1984 | Hettinger et al. ........ 208/77 |
| 4,746,419 | A |  | 5/1988 | Peck et al. |
| 4,940,531 | A |  | 7/1990 | Lussier |
| 4,946,581 | A |  | 8/1990 | van Broekhoven |
| 5,958,370 | A | * | 9/1999 | Zones et al. ............ 423/706 |
| 6,225,255 | B1 |  | 5/2001 | Shibasaki et al. |
| 6,342,152 | B1 |  | 1/2002 | Yoshita |
| 6,511,933 | B1 |  | 1/2003 | Shibasaki et al. |
| 6,530,965 | B2 |  | 3/2003 | Warchol |

* cited by examiner

*Primary Examiner*—Glenn Caldarola
*Assistant Examiner*—John Douglas
(74) *Attorney, Agent, or Firm*—Darby & Darby P.C.

(57) ABSTRACT

A catalytic composition useful for cracking and reducing the viscosity of heavy hydrocarbons. The catalytic composition comprises Portland cement, a volcanic ash component, titanium dioxide, and a transition metal salt. Optionally, a hydrogen source is added to the catalytic composition.

46 Claims, No Drawings

PRODUCTION OF LOWER MOLECULAR WEIGHT HYDROCARBONS

PRIORITY DATA

This application claims priority from U.S. Provisional Application Ser. No. 60/398,089 filed Jul. 24, 2002, which is incorporated hereby by reference.

BACKGROUND OF THE INVENTION

1. Field of the Invention

This invention relates to a process for catalytic decomposition (cracking) followed by hydrogenation of high molecular weight hydrocarbons to produce lower molecular weight hydrocarbon products in both surface and subsurface applications at ambient temperatures and pressure with no CO or $CO_2$ emissions.

This invention further pertains to the separation of inorganic solids, sands, clays, etc., from hydrocarbon compound substrates and mixtures or sludge derived from an originating petroleum source, subsurface or surface, or in the form of petroleum contaminated waste.

This invention also pertains to the complete or partial desulfurization by reduction of the sulfur-containing species.

This invention also pertains to the remediation of soils by the removal of hydrocarbon contaminants.

2. Description of Related Art/Prior Art

The generally accepted concept of the origination of oil and gas is that it was generated from the thermal degradation of kerogen, a fossilized material in shale and other sedimentary rock that yields oil upon heating. It is the most common source of carbon in the earth's crust. The major factors affecting the concentration of petroleum are the chemical nature of the kerogen, temperature, time, mineral composition, resident geological structure, etc.

Traditional technology for cracking and hydrogenation, such as catalytically cracking hydrocarbon, serve to form more valuable lower molecular weight products. Hydrocracking reactions between the initial hydrocarbon substrate and the catalytic agent may be carried out in a series of bed reactors or in a distillation column. Such reactions are endothermic and, as such, the reactors must be heated. Additionally, hydrogen is recycled through the system to ensure maximum hydrocarbon saturation to form the lower molecular weight hydrocarbon products and to remove excess hydrogen generated by the catalytic reaction. In these systems, polyaromatic rings are also opened and the by-products hydrogenated.

Substantial quantities of petroleum in the earth have proven difficult or impossible to recover because they are in the form of high molecular weight hydrocarbon mixtures which are distributed and intermixed in tar sands, shale, and various rock formations. Furthermore, hydrocarbon compounds cannot be economically extracted from "depleted" oil wells because they are not sufficiently concentrated to be extractable by drilling, have lost their original gas pressure, and/or have relatively high density and viscosity at the given location. The latter compounds will not flow unless heat energy is applied to the petroleum deposit, as, for example, by steam. Additionally, once extracted, these materials still require heat energy to remain as liquids and may be contaminated. Waste or contaminated materials (e.g., soil, rock, sludge, oil tars) containing hydrocarbons, crude or refined, cannot be economically extracted from naturally or man-made contaminated materials.

There are well known enhanced production techniques to obtain oil from depleted or under-producing wells. In situ combustion is a technique used to heat crude petroleum materials below the surface of the earth to reduce their viscosity. An oxidizing agent, such as air, is injected into the subsurface deposit at sufficiently high temperatures to initiate a combustion process or a phosphorous bomb or gas burner is lowered into the well. The lower molecular weight hydrocarbons generated then rise to the surface of the deposit. There are drawbacks to this procedure in that the high temperatures necessary for combustion, combined with the presence of oxygen, lead to undesirable side reactions of coking and the formation of phenols and ketones, which are difficult to process through other refining techniques.

Thermal recovery techniques from under-producing, depleted, and heavy oil wells and bitumen deposits may also comprise steam injection. The purpose of the injected steam is to heat the heavy hydrocarbon deposit, thereby significantly reducing the viscosity and making an economically acceptable level of recovery of the hydrocarbon deposit. In situ hydrovisbreaking and steam flooding are alternatives to the combustive techniques. Sometimes, in this process, a catalyst is suspended in the steam and circulated throughout a subsurface deposit. This heat permits the endothermic reaction to occur, causing lower molecular weight hydrocarbons rise to the surface of the petroleum deposit. This process may only be used in formations that have sufficient overburden thicknesses to withstand the injection of high temperature, high pressure materials.

Waterflooding techniques are also a frequently employed method to improve oil recovery from depleted or nearly depleted oil wells and can be expected to yield between 5% and 50% of the remaining petroleum products. The water to be injected must first be filtered to eliminate all potentially reactive particles. Then it is pumped into the well under pressure either from a group of strategically placed injection wells or from injection wells at the edge of the oilfield. Water rarely circulates evenly through the underground deposits. In most cases, the water permeates the deposits until it causes a breakthrough, creating a path of least resistance to the producing well along which the water will flow. The oil has a lower specific gravity than water and floats on top of the water. Such waterfloods are most effective in areas where there is little primary production. Variants of this technique include alkaline or caustic flooding, which involve the addition of basic agents to the water, such as sodium hydroxide.

Miscible gas drive for enhanced oil recovery involves injecting an inert gas, such as carbon dioxide, nitrogen, or liquefied petroleum gas into the reservoir. The gas mixes with the petroleum deposits, making the oil less viscous, and pressures the fluid oil towards the producing well. Sometimes alternating between pumping gas and water through the well is employed. Solvent or chemical flooding comprises injecting a liquid with different chemicals in batches (slugs) into a deposit. A micellar-polymer flood will contain a polymeric surfactant to wash reservoir pore spaces clean of the heavy oils present within the earth formation. Other solvents can be used to mix with and reduce the viscosity of the petroleum deposits. Frequently used solvents include aromatic hydrocarbons, carbon disulfide, and carbon tetrafluoride, which are all capable of dissolving bituminous petroleum deposits. Water-based solvents have been used, with both heated and unheated water, to carry active ingredients throughout subsurface formations. Solvents or chemicals are frequently pumped through pipelines along with the treated oil. These must be separated out, e.g., by distillation to preserve both expensive solvents and the treated oil. Elimination of this refining step would reduce complications and cost.

It can be relatively difficult and economically unfeasible to separate hydrocarbon compound mixtures from some of the inorganic solid materials that are naturally intermixed.

BRIEF SUMMARY OF THE INVENTION

This invention relates to compositions and methods for cracking and hydrogenating high molecular weight hydrocarbons to produce lower molecular weight hydrocarbons from substrates containing relatively higher molecular weight hydrocarbons. Hydrogenation is facilitated by the presence of water and, optionally, by the addition of refined and unrefined alkane and cycloalkane hydrocarbons ($C_5$-$C_{25}$). The treatment with the inventive composition results in the lower molecular weight characteristics, as can be shown by both increased API value (generally the API value is more than doubled) and lower viscosity. These substrates may be treated on the earth's surface or in subsurface deposits at ambient temperatures and pressures.

DETAILED DESCRIPTION OF THE INVENTION

The catalytic composition of the present invention is a reactive inorganic composition capable of homogeneous cracking and hydrogenation of high molecular weight hydrocarbon compounds in the presence of water at ambient temperature and pressure. The catalytic composition is an admixture of organic compounds in water.

The exact proportions of said catalytic composition are varied depending on the high molecular weight hydrocarbon to be treated and the desired lower molecular weight hydrocarbon products. The essential particulate components of the catalytic composition are $SiO_2$, $Al_2O_3$, $Fe_2O_3$, and CaO. Typical ranges are shown in Table 1 below. All weight percents are based on the total weight of these components combined in a particulate blend.

TABLE 1

| Particulate Component | Broad Range (wt. %) | Preferred Range (wt. %) |
|---|---|---|
| $SiO_2$ | 20-60 | 5-35 |
| $Al_2O_3$ | 1-10 | 1.5-5 |
| $Fe_2O_3$ | 0.5-15 | 1-10 |
| CaO | 20-40 | 25-35 |
| $TiO_2$/$B_2O_3$ | 2-4 | 2 |
| $FeCl_3$/$FeCl_2$ | 8-12 | 8 |

To form the catalytic composition, all of the particulate components must initially be ground to at least about 3000 Blaine. Blaine is a measurement of the ratio of a particle's surface area (in square centimeters) to weight (in grams). Then, these particles are blended with about one to five, preferably two to three times their weight water. An essential first reaction occurs when the solid particles are added to the water. This reaction forms reactive colloidal particles based on the connected surfaces of clays, metal oxides, zeolitic entities, and molecular sieves. The mixture is blended until the particles are completely suspended in the water.

Alternatively, the catalytic composition may use composite materials to provide the essential components. For example a cement component and a volcanic ash component may provide the $SiO_2$, $Al_2O_3$, $Fe_2O_3$, and CaO components. Table 2 below illustrates the broad and preferred ranges of these compounds.

TABLE 2

| Particulate Component | Broad Range (wt. %) | Preferred Range (wt. %) |
|---|---|---|
| Portland Cement | 30-50 | 45 |
| Volcanic Ash | 30-50 | 45 |
| $TiO_2$ | 2-4 | 2 |
| $FeCl_3$/$FeCl_2$ | 8-12 | 8 |

The cement component is most preferably a Portland cement. Portland cements are mixtures of limestone and clay that have been ground and treated in a kiln from 1400 to 1600° C. About 24% of Portland cement by weight is calcium silicate and about 66% by weight is CaO. Impurities may include up to about 3% by weight of alumina, ferric oxide, and magnesia.

The volcanic ash component may consist of scoria, pumice, tuff, tuffstone, mafic volcanic rock, ultramafic volcanic rock, pyroclastic rock, volcanic glasses, basalt or silica-based zeolites. Scoria is the most preferred volcanic ash component. The most preferred embodiment contains British Columbia scoria. Scoria is the most common material in volcanic cones and is formed of small particles (about 1 cm across) of hardened volcanic lava. British Columbia scoria consists of about 46% $SiO_2$, about 18% $Fe_2O_3$, about 8% CaO, and about 2.4% $TiO_2$. Scoria from southern Mexico consists of about 79% $SiO_2$ and about 6.6% $Fe_2O_3$. Pumice is a light pyroclastic rock that is hardened from a lava foam into a porous glass. Tuffstone is created from pieces of volcanic ash welded together by lithification upon eruption. Tuff consists of non-welded pieces of volcanic ash. Mafic rock is defined as igneous rock which contains substantial quantities of silicates, such as pyroxene, amphibole, olivine, and mica. Ultramafic rock a volcanic rock with an ultrabasic composition and over 90% composed of Fe-Mg minerals, predominantly olivine, orthopyroxene, and clinopyroxene. Pyroclastic rock is rock which is formed by either a volcanic explosion or an aerial expulsion from a volcanic vent. Volcanic glasses are called obsidian and consist of silica particles fused by the intense heat of a volcano. Basalt is a mafic, igneous rock composed of plagioclase. Different varieties of basalt differ in their degree of silica saturation. Zeolites are a family of aluminum silicate minerals that may occur naturally or be produced synthetically. Zeolites from British Columbia typically consist of about 89% $SiO_2$, 0.8% $Fe_2O_3$, and about 1% CaO.

Any transition metal salt with a +2 or +3 oxidation state will function in the catalytic composition. Preferred compounds include ferric chloride, ferrous chloride, cupric chloride, and cobalt chloride. Ferric chloride is the most preferred.

Not including the specific metal oxides listed above, the most preferred metal oxide is titanium dioxide ($TiO_2$). In the most preferred embodiment, titanium dioxide accounts for about 2% by weight of the total weight of the catalytic composition. Boron oxide ($B_2O_3$) can also be substituted and used in place of and in concert with $TiO_2$.

The components other than Portland cement are varied depending on the specific high molecular weight substrate being treated. Such customization can be readily carried out by testing small samples of the substrate with different catalytic compositions to determine the most effective components and relative component ratios. Particular examples are set forth below. Solid components may account for 2-10% by weight of the catalytic composition, and preferably comprise 5-10% by weight.

Though specific materials are recited herein by their common names, it will be understood that other composites formed of various minerals and compounds may also be used.

Optionally, refined and unrefined alkanes and cycloalkanes, such as naphtha or diesel fuel, of the $C_5$ to $C_{25}$ range are frequently employed to facilitate and intensify the hydrogenation process. This refined or unrefined hydrocarbon component is incorporated to serve as a hydrogen donor. The included water will also function as a hydrogen source. Typically, diesel fuel or naphtha is mixed with the high molecular weight hydrocarbon substrate prior to the addition of the aqueous colloid suspension. The refined or unrefined hydrocarbon component may consist of any $C_5$ to $C_{25}$ alkane or cycloalkane or mixture thereof and may range from 0 to 50% by weight of the total catalytic composition added. Naphtha or condensate is the most preferred refined hydrocarbon.

Catalytic composition to crude oil loading may vary from a ratio of 2:1 to 4:1. The preferable loading ratio is 3:1.

After vigorously admixing the catalytic composition in water with the high molecular weight hydrocarbon compounds and, optionally, with a refined hydrocarbon at ambient temperatures and pressures, a rapid, almost instantaneous, reaction of cracking and hydrogenation occurs to produce a product composed of lower molecular weight hydrocarbons. The lower molecular weight hydrocarbons float on top of the water-based colloid in a separate layer. Sulfur-based and metallic impurities form solid, inert precipitates upon reaction with the catalytic composition after mixing. The process proceeds to completion very rapidly, often within minutes from the time of complete addition of the catalytic composition with no $CO_2$ or $CO$ emissions.

The terms high molecular weight hydrocarbon and low molecular weight hydrocarbon as used herein are relative terms to one another. The term high molecular weight hydrocarbon signifies a mixture of hydrocarbons and their entrained impurities with an average molecular weight of the hydrocarbons higher than the average molecular weight of the hydrocarbons in a low molecular weight hydrocarbon. Thus, the use of the terms "high molecular weight hydrocarbon" and "low molecular weight hydrocarbon" does not signify any particular molecular weight ranges.

High molecular weight hydrocarbons are typically materials such as crude oils, asphaltenes, tars, heavy oils, and the like which have limited or no practical use, but which can be converted to more valuable and useful lower molecular weight hydrocarbons via chemical means. Medium oils have resins or polar fractions less than about 25% of the weight of the total oil and have API gravity of 20 to 30 with viscosities in the range of about 100 to 1000 centipoise; heavy oils have resins or polar fractions between about 25 and 40% of the total weight of the oil and have API gravity of 10 to 20 with a viscosities in the range of about 100 to 10000 centipoise; tars have resins or polar fractions greater than about 40% of the total weight of the oil and have API gravity less than about 8 to 10 and a viscosity greater than about 8000 centipoise.

The lowest molecular weight hydrocarbons may include $C_1$ to $C_4$ gases, e.g., methane, propane, natural gas. The inventive process also results in a reduction of density and viscosity and an increased API gravity value in the treated hydrocarbon mixture.

In the inventive process, any solid fraction in the starting high molecular weight hydrocarbon (soils, sediments, rock mixtures, sands, etc.) will precipitate to the bottom of the aqueous mixture. A significant percentage of heavy metal ion impurities in the starting high molecular weight hydrocarbon will attach or bind to the solid fraction in the precipitate. The low molecular weight hydrocarbon product will float to the surface of the water allowing for easy retrieval of the products.

1. Subsurface Application

For treatment of a high molecular weight hydrocarbon below the earth's surface, the solids in the inventive catalytic composition are initially slurried with water or with a water/refined hydrocarbon mixture. This mixture is then injected into a reservoir or source rock formation of an oil or gas well. This petroleum-containing geologic formation associated with a given oil and/or gas well may be considered "dead" or under-producing and still be a candidate for the inventive treatment. The catalytic composition will reduce oil density, increase API gravity, and reduce the viscosity of any contacted oil deposits. This will increase the value of the oil per barrel. Typical barrel price of heavy oil, with an API below 16, is about $8 to about $10. With the addition of about $1.50 to $2.00 of chemistry per barrel, the value of the same oil will increase to about $15 to about $18 per barrel.

In the context of a fracture and/or stimulation project on the given well, the composition may be injected under pressure. The chosen catalytic composition is directed to the reservoir formation associated with the oil or gas producing formation which has been deemed to have the greatest amount of oil and gas. The catalytic composition reacts with the silicates in the geologic formation as well as high molecular weight hydrocarbons present in the region of fracture/stimulation. The chemical reactions between the catalytic composition and the hydrocarbons generate $C_1$ to $C_4$ gases, most notably methane and butane, and these relatively lower viscosity hydrocarbon gases then diffuse into the surrounding hydrocarbon mass. This pervasive in-situ chemical reaction stimulates the formation of desirable lower molecular weight hydrocarbon liquid and gases with the lower density and viscosity.

Another subsurface application of the present invention can occur at shallow depths in heavy oil producing environments where the method of hydrocarbon recovery uses water flooding and a pressure circulation system through the oil-bearing formation. The catalytic composition can be added to the circulating water to cause cracking and hydrogenation reactions in the heavy oils, thereby reducing the viscosity by the generation of $C_1$ to $C_4$ gases and lower molecular weight hydrocarbons with lower density and viscosity. This causes and increased rate of recovery of desirable hydrocarbons from the treated well. Also, the quality of the recovered oil is improved. The addition of the catalytic composition to steam being injected into the treated hydrocarbons is also possible.

The present invention will allow the oil to be recovered more rapidly than conventional technology, thereby using less steam, energy, and time for the upgrading and recovery process. The overall petroleum quality in terms of a reduction in viscosity and API value would be improved by the application of these enhanced production technologies. Treated oils with lower viscosities and densities may increase the value and efficiency of heavy oils that need to be transported by pipelines.

2. Surface Application

The inventive procedure may be used to upgrade high molecular weight hydrocarbon material or substrates on the earth's surface. For example, it may be used in the treatment or "upgrading" of tar sands or heavy oil. The hydrocarbon is treated in a storage and mixing facility. The catalytic composition is admixed with the substrate of high molecular weight hydrocarbon material. Diesel fuel or condensate or a like refined or unrefined hydrocarbon is added to the admixture as a supplemental hydrogen source for the cracking reactions. Upgrading consists of chemically treating or fractionating bitumen or heavy oils to increase its value by reducing the density and viscosity, thereby generating a higher quality crude oil substitute. The specific objectives of upgrading are to increase the percentage of the saturate and aromatic fractions, reduce the polar and pentane insolvable fractions, reduce viscosity, increase API gravity, and reduce overall hydrocarbon molecular weight. API gravity is a term to relate the relative specific densities of oil products developed by the American Petroleum Institute. To convert between API gravity and specific gravity, the following formula should be followed: API to specific gravity: $SG=141.5/(131.5+° API)$.

By reducing the density, increasing the API gravity, and reducing the viscosity heavy oil or tar sands bitumen would need no or reduced addition of condensate to allow the oil to be pumped through pipes. For example, there exists a pipeline that moves 778,000 barrels of heavy oil per day from Alberta to U.S. In addition to the oil, 300,000 barrels of condensate are added so it can be pumped. The value of the oil is currently $12 per barrel. If the API gravity were 20 to 23, then there would be no need of condensate. The value of the treated oil would now be $16-$18 per barrel and the operator could then pump 1,000,000 barrels of oil per day. Condensate is in such short supply that the condensate is currently distilled out of the oil in the U.S. and pumped back to Alberta daily.

For surface applications of the present invention, the inventive reaction may be carried out at ambient temperatures and pressure, i.e., at about room temperature, which is defined as about 20 to 25° C. (about 68 to 77° F.). Ambient pressure is about 1 atmosphere (about 760 Torr).

3. Desulfurization and the Elimination of Hydrogen Sulfide

Hydrogen sulfide may be generated in large amounts by thermal cracking from kerogen and from liquid sulfur-containing compounds present in crude oils. Sulfur content of crude oil generally decreases with depth, possibly due to cracking and elimination of sulfur as $H_2S$. The total sulfur content in crude oil, heavy oil, bitumens, and tars varies from 0.04% to 8%. Generally, oils with high densities and low API gravities will have higher sulfur contents.

Some of the hydrogen generated from surface catalytic reactions between the catalytic composition and water and with the refined or unrefined hydrogen source will convert sulfur heteroatoms in the polar (resin) and asphaltene fractions to $H_2S$. Through a series of oxidation reactions, the catalytic composition converts the $H_2S$ to $CaSO_4$. Free sulfur, if present, may also react with the hydrocarbons to produce $H_2S$. Sulfate reduction, if present in the sediments, and the related oxidation of hydrocarbons may also occur beyond 150° C., resulting in the generation of $H_2S$ and $CO_2$.

4. Soil Decontamination

The inventive catalytic compound may be mixed with contaminated soil in a tank containing water and mechanically agitated with the injection of air. The contaminated soil will be remediated through the cracking and hydrogenating the impurities. The treated soil will precipitate to the bottom of the reaction vessel and the organic waste products will float on the surface of the water. The hydrocarbon layer can be decanted off and reused as a secondary fuel. Also, the catalytic compound may be injected and mixed into the soil on the ground, achieving the same end state results.

The following examples illustrate embodiments of the invention, but are not intended to be limiting:

EXAMPLE 1

Crude oil samples (about 200 to 250 grams each) were taken straight from the well at the Lloydminister oil fields, Lloydminister, Alberta, Canada (API gravity 16 to 18) and Peace River oil fields, Peace River, Alberta, Canada (API gravity 8 to 10). The samples were each placed in two-liter jars and an equal weight of water heated to 100° C. was added to facilitate mixing with the catalytic composition. The samples were allowed to cool to ambient temperature (16° C.) after treatment. The jars had screw-on gas tight lids with rubber diaphragms in place of a hole that had been drilled in the covers to allow withdrawal of headspace gas samples for analysis. The inventive composition, in powder form, was added to each of the samples in amounts of 5 and 10% by weight to weight of oil. The composition contained 48% Portland cement, 42% volcanic glasses-red scoria, 8% ferric chloride and 2% titanium dioxide, all percentages being based on the total weight of the composition.

The following table shows the weight percent of Portland cement and volcanic ash components in the catalytic composition.

TABLE 3

| Catalytic Composition | $SiO_2$ | $Al_2O_3$ | $Fe_2O_3$ | $CaO$ |
|---|---|---|---|---|
| Portland Cement | 8.65% | 2.10% | 1.30% | 27.03% |
| Volcanic Ash | 34.65% | 3.97% | 1.03% | 0.12% |

The samples were then stirred with a metal rod for 1.5 to 2 minutes and the lids were then screwed on tightly. A separate set of control samples of each crude oil without the added catalytic composition were allowed to stand for four days at ambient temperatures and pressure. Thereafter, the headspace gases were analyzed by gas chromatography for each sample.

Significant amounts of hydrocarbon gases were found in the headspace gas of the Lloydminister samples, except for the control, in which there was only a water and oil mixture present. Specifically, compared to the control sample, the treated headspace gas contained 41 times more methane, 23 times more ethane, 14 times more propane, 10 times more isobutene, and 71 times more butane. The speed of the reaction is very fast and that for the Peace River samples, hydrocarbon gases were generated very rapidly and lost before the lid could be placed on the jar, or not generated for some reason. The composition of the headspace gases was determined by gas chromatography.

Additional tests with crude oil from Lloydminister field showed that hydrocarbon gases were rapidly generated and the analysis indicated that 2 to 3% of the total initial carbon was converted to $C_1$ to $C_4$ hydrocarbon gases, with methane being the most prominent in quantity. No hydrocarbon gases were found in the headspace gases of the treated Peace River samples.

Saturate, aromatic, polar, and pentane insoluble fractions (SAPA) analysis of the treated and untreated heavy oil showed significant changes in the Lloydminister heavy crude oil samples. The 9% and 8% increases in the saturates and aromatic fractions, respectively, and the 19% and 1% decreases in the polar and pentane insoluble fractions, respectively, represent significant improvements in the quality of that heavy oil sample.

There was a consistent 2% lower distillation temperature across the mass spectrum of the saturates fraction for the untreated Lloydminister heavy oil relative to the saturates fraction of the untreated oil. This means the treated saturates fraction was a relatively lighter molecular weight fraction than the untreated saturates fraction.

EXAMPLE 2

Samples of Syncrude bitumen were prepared to demonstrate the effectiveness of different embodiments of the present invention. Three liquid samples of Syncrude bitumen were blended with 35-50% by weight of naphtha. For two samples, the catalytic composition was prepared by adding the inorganic composition to hot tap water and mixing with a metal stirring rod the resulting colloid into the crude oil sample. The third sample received no addition of the catalytic composition and serves as the control. The catalytic composition called "Mix 1" consisted of 45% by weight Portland cement, 45% by weight volcanic scoria from British Columbia, 2% by weight titanium dioxide, and 8% by weight ferric chloride. "Mix 2" consisted of 45% Portland cement, 45% clinoptilolite zeolite from British Columbia, 2% titanium dioxide, and 8% ferric chloride.

The following table shows the weight percent of the Portland cement and volcanic ash components in the Mix 1 and Mix 2 catalyst compositions.

TABLE 4

| Catalytic Compositions | $SiO_2$ | $Al_2O_3$ | $Fe_2O_3$ | CaO |
|---|---|---|---|---|
| Mix 1 | | | | |
| Portland Cement | 8.65% | 2.10% | 1.30% | 27.03% |
| Volcanic Ash | 20.70% | 0% | 8.10% | 0% |
| Mix 2 | | | | |
| Portland Cement | 8.65% | 2.10% | 1.30% | 27.03% |
| Zeolite | 40.05% | 0% | 0.36% | 0.45% |

100 grams of naphtha were added to 300 grams of hot tap water and 10 grams of the catalytic compositions described above, for those samples receiving the composition.

The inventive treatment for each oil sample was added and mixed vigorously for about 30 seconds. The reaction was completed almost instantaneously. The liquid in the jar separated into three layers; the treated oil at the top, a water layer in the middle, and a precipitate of inorganic material at the bottom. The gas generation occurred slowly through low bubbling and was even evidenced briefly in the sample without the catalytic composition.

When the reaction vessels were opened, measurements were conducted to determine the change in the viscosity of each sample and SAPA (Saturate, Aromatic, Polars or resins, and Pentane insolubles or asphaltenes) analyses were performed. Table 5 below uses these characteristics to demonstrate the properties of each sample.

TABLE 5

| Oil Sample | Saturates | Aromatics | Polars or Resins | Pentane Insolubles - Asphaltenes | API | Viscosity (centipoises) |
|---|---|---|---|---|---|---|
| Syncrude Bitumen & Naphtha - Untreated | 12 | 26.4 | 40.7 | 20.9 | 27.3 | 91.88 |
| Syncrude Bitumen, Naphtha, & Mix 1 | 13.8 | 23.9 | 37.4 | 24.9 | | 91.88 |
| % Change | +15.0% | −9.5% | −8.1% | +19.1% | | |
| Syncrude Bitumen, Naphtha & Mix 2 | 13.1 | 22.4 | 41.8 | 22.7 | | 380.8 |
| % Change | +9.2% | −15.2% | +2.7% | +8.6% | | |

After 24 hours, headspace gases generated in each sample were analyzed. The gas analyses of the Mix 1 and Mix 2 samples showed the same compounds and relative concentrations as was found in the untreated control sample. However, the $CO_2$ level was 91% less in the treated samples than it was in the untreated sample. It is possible that the hydrocarbon gases generated by the inventive process were reabsorbed into the treated hydrocarbon mass.

EXAMPLE 3

Samples of heavy oil from the Lloydminister oil fields were prepared to demonstrate the effectiveness of different embodiments of the present invention. This sample had an initially high polar fraction, 38.7%. Polar fractions have a dramatic effect on the viscosity and density of an oil sample. Two 200-gram liquid samples of oil bitumen with an initial API gravity of 9.9 were tested. The process for addition and composition of the catalytic composition used in this example is the same as that described in mix 1 of example 2 above. The specific catalytic composition consisted of 45% by weight Portland cement, 45% by weight volcanic scoria from British Columbia, 2% by weight titanium dioxide, and 8% by weight ferric chloride. Diesel fuel and the catalytic composition were added to Sample 1. After 1 hour, the API gravity of Sample 1 had reached 22.1 and, after 24 hours, was 27.3. Sample 2 had no diesel fuel added, and reached an API gravity of 14.9 one hour after the addition of the catalytic composition, and an API gravity of 17.5 24 hours later.

After 24 hours of reacting, the reaction vessels were opened and measurements were conducted to determine the change in the viscosity of each sample and SAPA (Saturate, Aromatic, Polars or resins, and Pentane insolubles or asphaltenes) analyses were performed. Table 6 below uses these characteristics to demonstrate the properties of each sample.

TABLE 6

| Oil Sample | Saturates | Aromatics | Polars or Resins | Pentane Insolubles - Asphaltenes | API |
|---|---|---|---|---|---|
| Untreated Oil | 17 | 25 | 22.0 | 19 | 9.9 |
| Sample 1 | 21 | 25 | 22.0 | 14 | 27.3 |
| % Change | +24% | 0 | 0 | −26% | 176% |

TABLE 6-continued

| Oil Sample | Saturates | Aromatics | Polars or Resins | Pentane Insolubles - Asphaltenes | API |
|---|---|---|---|---|---|
| Sample 2 | 20 | 26 | 18 | 17 | 17.5 |
| % Change | +18% | +4% | −18% | −11% | 77% |

What is claimed is:

1. A catalytic composition for upgrading high molecular weight hydrocarbons comprising an admixture of water and the reaction products of particles of the following components:
   i. about 15 to 35 weight percent silicon dioxide,
   ii. about 1 to 6 weight percent aluminum oxide,
   iii. about 5 to 20 weight percent ferric oxide,
   iv. about 10 to 30 weight percent calcium oxide,
   v. at least about 2 weight percent titanium dioxide or boron oxide, and
   vi. at least about 8 weight percent transition metal salt;
   the weight percents being based on the total weight of components (i)-(vi), and the composition comprises up to 50 weight percent $C_5$ to $C_{25}$ alkane or cycloalkane, based on the total weight of the composition.

2. The composition of claim 1, wherein the $C_5$ to $C_{25}$ alkane or cycloalkane is diesel fuel or naphtha.

3. The catalytic composition of claim 1, wherein the transition metal salt is one or more of the compounds selected from ferric halides, cupric halides, cobalt halides, and ferrous halides.

4. An admixture of a high molecular weight hydrocarbon and the catalytic composition of claim 1 wherein the weight ratio of the high molecular weight hydrocarbon to the catalytic composition is from 2:1 to 4:1.

5. The admixture of claim 4 wherein the high molecular weight hydrocarbon composition is one or more components selected from bitumens, asphaltenes, oils, and tars.

6. A catalytic composition comprising an admixture of water and the reaction products of particles of a cement component, a volcanic ash component, a transition metal salt, and titanium dioxide or boron oxide, wherein the weight percents of the components are as follows:
   i. 30 to 50 weight percent cement component,
   ii. 30 to 50 weight percent volcanic ash component,
   iii. at least 2 weight percent titanium dioxide or boron oxide, and
   iv. at least 8 weight percent transition metal salt;
   the weight percents being based on the total weight of components (i)-(iv), and the composition comprises up to 50 weight percent $C_5$ to $C_{25}$ alkane or cycloalkane, based on the total weight of the composition.

7. The composition of claim 6, wherein the $C_5$ to $C_{25}$ alkane or cycloalkane is diesel fuel or naphtha.

8. The catalytic composition of claim 6, wherein the cement component is Portland cement.

9. The catalytic composition of claim 6, wherein the volcanic ash component is one or more components selected from scoria, basalt, pyroclastic rock, tuff, tuffstone, volcanic glass, pumice, mafic rock, ultramafic rock, and silicate-based zeolites.

10. The catalytic composition of claim 6, wherein the transition metal salt is one or more of the compounds selected from ferric halides, cupric halides, cobalt halides, and ferrous halides.

11. A catalytic composition comprising an admixture of water and the reaction products of particles of a cement component, a volcanic ash component, a transition metal salt, and titanium dioxide or boron oxide, wherein the particles have a Blaine surface area to weight ratio of at least 3000 cm$^2$/gm, the volcanic ash component is scoria or a mixture of scoria and basalt, the transition metal salt is ferric chloride and the catalytic composition comprises at least 2 weight percent of titanium dioxide.

12. An admixture of a high molecular weight hydrocarbon and the catalytic composition of claim 11, wherein the weight ratio of the high molecular weight hydrocarbon to the catalytic composition is from 2:1 to 4:1.

13. The admixture of claim 12, wherein the high molecular weight hydrocarbon composition is one or more components selected from bitumens, asphaltenes, oils, and tars.

14. A method of making a catalytic composition for the upgrading of a high molecular weight hydrocarbon composition which comprises:
   (a) admixing particles having a Blaine surface area to weight ratio of at least 3000 cm$^2$/gm of silicon dioxide, aluminum oxide, ferric oxide, calcium oxide, titanium dioxide or boron oxide, and a transition metal salt; and
   (b) blending the admixture with water,
   wherein the weight percents of the components are as follows:
   i. about 15 to 35 weight percent silicon dioxide,
   ii. about 1 to 6 weight percent aluminum oxide,
   iii. about 5 to 20 weight percent ferric oxide,
   iv. about 10 to 30 weight percent calcium oxide,
   v. at least about 2 weight percent titanium dioxide or boron oxide, and
   vi. at least about 8 weight percent transition metal salt;
   the weight percents being based on the total weight of components (i)-(vi).

15. The method of claim 14, wherein the transition metal salt is one or more of the compounds selected from ferric halides, cupric halides, cobalt halides, and ferrous halides.

16. The method of claim 14, further including blending the admixture with a $C_5$ to $C_{25}$ alkane or cycloalkane.

17. The method of claim 16, wherein the admixture is blended with up to 50 weight percent $C_5$ to $C_{25}$ alkane or cycloalkane, based on the total weight of the admixture and the $C_5$ to $C_{25}$ alkane or cycloalkane.

18. The method of claim 16, wherein the $C_5$ to $C_{25}$ alkane or cycloalkane is diesel fuel or naphtha.

19. A method of making a catalytic composition for the upgrading of a high molecular weight hydrocarbon composition which comprises
   (a) admixing particles of the following components having a Blaine surface area to weight ratio of at least 3000 cm$^2$/gm:
   i. about 30 to 50 weight percent cement component,
   ii. about 30 to 50 weight percent volcanic ash component,
   iii. at least about 2 weight percent titanium dioxide or boron oxide, and
   iv. at least about 8 weight percent transition metal salt,
   the weight percents being based on the total weight of components (i)-(iv); and
   (b) blending the admixture with water.

20. The method of claim 19, wherein the cement component is Portland cement.

21. The method of claim 19, wherein the volcanic ash component is one or more components selected from scoria, basalt, pyroclastic rock, tuff, tuffstone, volcanic glass, pumice, mafic rock, ultramafic rock, and silicate-based zeolites.

22. The method of claim 19, wherein the transition metal salt is one or more of the compounds selected from ferric halides, cupric halides, cobalt halides, and ferrous halides.

23. The method of claim 19, further including blending the admixture with a $C_5$ to $C_{25}$ alkane or cycloalkane.

24. The method of claim 23, wherein the $C_5$ to $C_{25}$ alkane or cycloalkane is diesel fuel or naphtha.

25. The method of claim 23, wherein the admixture is blended with up to 50 weight percent $C_5$ to $C_{25}$ alkane or cycloalkane, based on the total weight of the admixture and the $C_5$ to $C_{25}$ alkane or cycloalkane.

26. A method of cracking a high molecular weight hydrocarbon composition to form a lower molecular weight hydrocarbon product, comprising:
  (a) contacting, in the liquid phase, a catalytic composition with a high molecular weight hydrocarbon to hydrogenate and crack the high molecular weight hydrocarbon; and
  (b) recovering the lower molecular weight hydrocarbon product formed in step (a), the lower molecular weight product having an average API value greater than the API value of the high molecular weight hydrocarbon composition;
wherein said catalytic composition comprises an admixture of water and the reaction products of particles of the following components: silicon dioxide, aluminum oxide, ferric oxide, calcium oxide, titanium dioxide or boron oxide, and a transition metal salt, wherein the particles have a Blaine surface area to weight ratio of at least 3000 $cm^2/gm$.

27. The method of claim 26, wherein the high molecular weight hydrocarbon composition is one or more components selected from bitumens, asphaltenes, oils, and tars.

28. The method of claim 26, wherein the weight ratio of the high molecular weight hydrocarbon to the catalytic composition is from 2:1 to 4:1.

29. A method of cracking a high molecular weight hydrocarbon composition to form a lower molecular weight hydrocarbon product, comprising:
  (a) contacting a catalytic composition with a high molecular weight hydrocarbon at ambient temperature and pressure to hydrogenate and crack the high molecular weight hydrocarbon; and
  (b) recovering the lower molecular weight hydrocarbon product formed in step (a), the lower molecular weight product having an average API value greater than the API value of the high molecular weight hydrocarbon composition;
wherein said catalytic composition comprises an admixture of water and the reaction products of particles of the following components: silicon dioxide, aluminum oxide, ferric oxide, calcium oxide, titanium dioxide or boron oxide, and a transition metal salt, said particles having a Blaine surface area to weight ratio of at least 3000 $cm^2/gm$.

30. A method of cracking a high molecular weight hydrocarbon composition to form a lower molecular weight hydrocarbon product, comprising:
  (a) contacting, in the liquid phase, the composition of claim 1 with a high molecular weight hydrocarbon to hydrogenate and crack the high molecular weight hydrocarbon; and
  (b) recovering the lower molecular weight hydrocarbon product formed in step (a);
the lower molecular weight product having an average API value greater than the API value of the high molecular weight hydrocarbon composition.

31. The method of claim 30, wherein the high molecular weight hydrocarbon composition is one or more components selected from bitumens, asphaltenes, oils, and tars.

32. The method of claim 30, wherein the weight ratio of the high molecular weight hydrocarbon to the catalytic composition is from 2:1 to 4:1.

33. A method of cracking a high molecular weight hydrocarbon composition to form a lower molecular weight hydrocarbon product, comprising:
  (a) contacting a catalytic composition with a high molecular weight hydrocarbon at ambient temperature and pressure to hydrogenate and crack the high molecular weight hydrocarbon; and
  (b) recovering the lower molecular weight hydrocarbon product formed in step (a), the lower molecular weight product having an average API value greater than the API value of the high molecular weight hydrocarbon composition;
wherein said catalytic composition comprises an admixture of water and the reaction products of particles of the following components: silicon dioxide, aluminum oxide, ferric oxide, calcium oxide, titanium dioxide or boron oxide, and a transition metal salt, said particles having a Blaine surface area to weight ratio of at least 3000 $cm^2/gm$ and the weight percents of the components are as follows:
  i. about 15 to 35 weight percent silicon dioxide,
  ii. about 1 to 6 weight percent aluminum oxide,
  iii. about 5 to 20 weight percent ferric oxide,
  iv. about 10 to 30 weight percent calcium oxide,
  v. at least about 2 weight percent titanium dioxide or boron oxide, and
  vi. at least about 8 weight percent transition metal salt;
said weight percents being based on the total weight of components (i)-(vi), and the catalytic composition comprises up to 50 weight percent $C_5$ to $C_{25}$ alkane or cycloalkane, based on the total weight of the catalytic composition.

34. A method of cracking a high molecular weight hydrocarbon composition to form a lower molecular weight hydrocarbon product, comprising:
  (a) contacting, in the liquid phase, a catalytic composition with a high molecular weight hydrocarbon to hydrogenate and crack the high molecular weight hydrocarbon; and
  (b) recovering the lower molecular weight hydrocarbon product formed in step (a), the lower molecular weight product having an average API value greater than the API value of the high molecular weight hydrocarbon composition;
wherein said catalyst composition comprises an admixture of water and the reaction products of particles of a cement component, a volcanic ash component, a transition metal salt, and titanium dioxide or boron oxide, wherein the particles have a Blaine surface area to weight ratio of at least 3000 $cm^2/gm$.

35. The method of claim 34, wherein the high molecular weight hydrocarbon composition is one or more components selected from bitumens, asphaltenes, oils, and tars.

36. The method of claim 34, wherein the weight ratio of the high molecular weight hydrocarbon to the catalytic composition is from 2:1 to 4:1.

37. A method of cracking a high molecular weight hydrocarbon composition to form a lower molecular weight hydrocarbon product, comprising:
  (a) contacting a catalytic composition with a high molecular weight hydrocarbon at ambient temperature and pressure to hydrogenate and crack the high molecular weight hydrocarbon; and
  (b) recovering the lower molecular weight hydrocarbon product formed in step (a), the lower molecular weight product having an average API value greater than the API value of the high molecular weight hydrocarbon composition;
wherein said catalytic composition comprises an admixture of water and the reaction products of particles of a cement component, a volcanic ash component, a transition metal salt, and titanium dioxide or boron oxide, said particles having a Blaine surface area to weight ratio of at least 3000 cm$^2$/gm.

38. A method of cracking a high molecular weight hydrocarbon composition to form a lower molecular weight hydrocarbon product, comprising:
    (a) contacting, in the liquid phase, the composition of claim 6 with a high molecular weight hydrocarbon to hydrogenate and crack the high molecular weight hydrocarbon; and
    (b) recovering the lower molecular weight hydrocarbon product formed in step (a),
the lower molecular weight product having an average API value greater than the API value of the high molecular weight hydrocarbon composition.

39. The method of claim 38, wherein the high molecular weight hydrocarbon composition is one or more components selected from bitumens, asphaltenes, oils, and tars.

40. The method of claim 38, wherein the weight ratio of the high molecular weight hydrocarbon to the catalytic composition is from 2:1 to 4:1.

41. A method of cracking a high molecular weight hydrocarbon composition to form a lower molecular weight hydrocarbon product, comprising:
    (a) contacting a composition with a high molecular weight hydrocarbon at ambient temperature and pressure to hydrogenate and crack the high molecular weight hydrocarbon; and
    (b) recovering the lower molecular weight hydrocarbon product formed in step (a), the lower molecular weight product having an average API value greater than the API value of the high molecular weight hydrocarbon composition;
wherein said composition comprises an admixture of water and the reaction products of particles of a cement component, a volcanic ash component, a transition metal salt, and titanium dioxide or boron oxide, said particles having a Blaine surface area to weight ratio of at least 3000 cm$^2$/gm and the weight percents of the components are as follows:
    i. 30 to 50 weight percent cement component,
    ii. 30 to 50 weight percent volcanic ash component,
    iii. at least 2 weight percent titanium dioxide or boron oxide, and
    iv. at least 8 weight percent transition metal salt;
said weight percents being based on the total weight of components (i)-(iv), and the composition further comprises a C$_5$ to C$_{25}$ alkane or cycloalkane in an amount up to 50 weight percent, based on the total weight of the composition.

42. A catalytic composition comprising an admixture of water and the reaction products of particles of a (i) cement component, (ii) a volcanic ash component comprising scoria or a mixture of scoria and basalt, (iii) a transition metal salt, and (iv) titanium dioxide or boron oxide, wherein the particles have a Blaine surface area to weight ratio of at least 3000 cm$^2$/gm.

43. A method of making a catalytic composition for the upgrading of a high molecular weight hydrocarbon composition which comprises:
    (a) admixing particles having a Blaine surface area to weight ratio of at least 3000 cm$^2$/gm of (i) a cement component, (ii) a volcanic ash component comprising scoria or a mixture of scoria and basalt, (iii) a transition metal salt, and (iv) titanium dioxide or boron oxide; and
    (b) blending the admixture with water.

44. A method of cracking a high molecular weight hydrocarbon composition to form a lower molecular weight hydrocarbon product, comprising:
    (a) contacting (i) a catalytic composition comprising an admixture of water and the reaction products of (A) particles of a cement component, (B) a volcanic ash component comprising scoria or a mixture of scoria and basalt, (C) a transition metal salt, and (D) titanium dioxide or boron oxide, wherein the particles have a Blaine surface area to weight ratio of at least 3000 cm$^2$/gm with (ii) a high molecular weight hydrocarbon to hydrogenate and crack the high molecular weight hydrocarbon; and
    (b) recovering the lower molecular weight hydrocarbon product formed in step (a),
the lower molecular weight product having an average API value greater than the API value of the high molecular weight hydrocarbon composition.

45. A method of cracking a high molecular weight hydrocarbon composition to form a lower molecular weight hydrocarbon product, comprising:
    (a) contacting a catalytic composition comprising an admixture of water and the reaction products of particles of:
        i. 30 to 50 weight percent of a cement component,
        ii. 30 to 50 weight percent of scoria or a mixture of scoria and basalt,
        iii. at least 2 weight percent of titanium dioxide or boron oxide,
        iv. at least 8 weight percent of transition metal salt;
the weight percents being based on the total weight of components (i)-(iv), wherein the particles of a Blaine surface area to weight ratio of at least 3000 cm$^2$/gm, and up to 50 weight percent of C$_5$ to C$_{25}$ alkane or cycloalkane, based on the total weight of the composition, with a high molecular weight hydrocarbon to hydrogenate and crack the high molecular weight hydrocarbon; and
    (b) recovering the lower molecular weight hydrocarbon product formed in step (a);
the lower molecular weight product having an average API value greater than the API value of the high molecular weight hydrocarbon composition.

46. A method of cracking a high molecular weight hydrocarbon composition to form a lower molecular weight hydrocarbon product, comprising:
    (a) contacting a catalytic composition with a high molecular weight hydrocarbon at ambient temperature and pressure to hydrogenate and crack the high molecular weight hydrocarbon; and
    (b) recovering the lower molecular weight hydrocarbon product formed in step (a), the lower molecular weight product having an average API value greater than the API value of the high molecular weight hydrocarbon composition;
wherein said catalyst composition comprising an admixture of water and the reaction products of the particles on the fine components: silicon dioxide, aluminum oxide, ferric oxide, calcium oxide, titanium dioxide or boron oxide, and a transition metal salt, wherein the particles have a Blaine surface area to weight ratio of at least 3000 cm$^2$/gm.

* * * * *